United States Patent [19]

McGregor

[11] Patent Number: 5,800,703
[45] Date of Patent: Sep. 1, 1998

[54] WATER FILTER WITH HYDRAULICALLY DISPLACEABLE FILTER UNIT

[75] Inventor: Duncan C. McGregor, Scottburgh, South Africa

[73] Assignee: Katah Holding AB, Switzerland

[21] Appl. No.: 502,680

[22] Filed: Jul. 14, 1995

[30] Foreign Application Priority Data

Jul. 21, 1994 [ZA] South Africa ............... 94/5375

[51] Int. Cl.⁶ .................. E04H 4/16; C02F 1/467; B01D 27/00
[52] U.S. Cl. .................. 210/169; 210/192; 210/206; 210/234; 210/416.2; 210/420
[58] Field of Search ................. 210/106, 169, 210/192, 206, 234, 416.2, 420; 254/934

[56] References Cited

U.S. PATENT DOCUMENTS

| | | | |
|---|---|---|---|
| 3,143,499 | 8/1964 | Miller | 210/169 |
| 3,169,920 | 2/1965 | Payne | 210/169 |
| 3,820,173 | 6/1974 | Weller | 210/169 |
| 4,555,323 | 11/1985 | Collier | 210/169 |
| 4,641,815 | 2/1987 | Yu | 254/934 |
| 4,749,477 | 6/1988 | McGregor | 210/169 |
| 4,784,371 | 11/1988 | Kamper | 254/934 |
| 4,966,700 | 10/1990 | Pall | 210/396 |
| 4,995,973 | 2/1991 | Ballenger et al. | 210/420 |
| 5,208,923 | 5/1993 | Stiver | 210/169 |
| 5,384,045 | 1/1995 | Chmielewski et al. | 210/169 |

*Primary Examiner*—Ivars Cintins
*Assistant Examiner*—Theodore M. Green
*Attorney, Agent, or Firm*—Tilton, Fallon, Lungmus & Chestnut

[57] ABSTRACT

A water filter including a filter unit utilizing bag filters and including a hydraulic jack for displacing the bag filters between a lower operative position and an elevated position where the bags are readily accessible the jack preferably in the form of a pair of relatively extensible tubular telescopic members in a flow path between a pump delivery connection and the inlet to the filter bags with one of the members providing a flow communication from the member to the filter outlet. The filter also includes inlet means to the filter bag directing flow to wash the interior surface of the bags.

10 Claims, 6 Drawing Sheets

WATER FILTER WITH HYDRAULICALLY DISPLACEABLE FILTER UNIT

INTRODUCTION

This invention relates to a filter. It relates in particular to a filter for a swimming pool.

BACKGROUND OF THE INVENTION

Bag filters for use in swimming pools have been developed and used and provide for good filtration of dirt and debris from the pool water. The bags must be kept reasonably clean for the filtration to remain effective and this requires that the bags be periodically removed to be cleaned. This is usually a tedious operation.

Further filtration through the bags usually results in the whole surface of the bag being subjected to substantially the same flow and leaves and similar debris block off large areas of the bag through which filtration could take place and the bags become prematurely blocked.

OBJECT OF THE INVENTION

It is the object of the present invention to provide a bag-type filter in which the above mentioned disadvantages are mitigated to some extent.

SUMMARY OF THE INVENTION

According to one aspect of the invention there is provided a water filter having an inlet and an outlet and which includes between the inlet and the outlet a filter unit comprising at least one filter bag and hydraulic displacement means which is selectively operable to displace the filter bag between an operative position in which water to be filtered can pass therethrough, and a displaced position in which the filter bag is readily accessible for cleaning or replacement.

According to another aspect of the invention there is provided a filter which includes a filter unit comprising at least one filter bag and inlet means directing liquid to be filtered into the filter bag, the means being such that, in use, at least a portion of the liquid fed into the filter bag is directed in the form of a jet towards the side of the filter bag to dislodge filtered matter therefrom.

The filter system includes a pump having a suction side and a delivery side, the filter unit being in flow communication with the delivery side of the pump.

Further features of this invention provide for the filter unit to include a plurality of filter bags connected in parallel to a manifold which has an inlet connected to the pump delivery and for the displacement means to be hydraulic jacking means having an inlet connected to the pump delivery and an outlet connected to the filter unit.

The invention also provides for the jack to include a pair of tubular vertically extensible telescopic members and valve means for regulating the flow of water therethrough such that, in use, when the valve means is open water flows through the tubular members which remain in a retracted condition so that the filter bag or bags remain in a lowered position, and when the valve means is closed flow through the tubular members is at least restricted which causes the tubular members to extend and to raise the filter bag or bags.

Still further features of this invention provide for a bleed passage to communicate between one of the tubular members and the outlet from the filter so that excess water can be bled from the tubular members when they are in their fully extended configuration and for the filter bag inlet means to include a plurality of circumferentially spaced outwardly directed nozzles configured to direct water flowing therethrough towards the sides of the filter bag.

According to yet another aspect of the invention, the filter includes water treatment means preferably in the form of an automatic chlorinator.

The chlorinator may be a salt chlorinator which is energised simultaneously with the pump motor so that the chlorinator is in operation only when the pump is operating and when water is flowing through the filter.

The filter unit is preferably of the type described in the specification of Applicant's U.S. Pat. No. 4749477 and the disclosure in that specification is incorporated herein by reference.

BRIEF DESCRIPTION OF THE DRAWINGS

A preferred embodiment of the invention is described below with reference to the accompanying diagrammatic drawings as applied to a swimming pool water filter.

In the drawings.

DETAILED DESCRIPTION OF THE INVENTION WITH REFERENCE TO THE DRAWINGS

Referring to the drawings, reference numeral 10 refers generally to a filter in accordance with the preferred embodiment of this invention. The filter includes a portable housing 12 having an upper part 14 within which is mounted a pump 30 and motor 34. A lower part 16 of the housing 12 contains a filter unit 15 operatively connected to the pump delivery and depends outboard motor fashion from the upper part 14 over the edge 21 of a swimming pool of water 20 requiring filtration. The said lower part 16 of the housing 12 has an inlet opening 18 and is immersible in the water 20. The surface 20.1 of water 20 lies at a level in line with the inlet opening 18. The flow through the inlet opening 18 is controlled by a buoyant weir 22 which is pivotally mounted about an axis 24.

Water is drawn from the pool through the inlet opening 18 and through a sieve 26 and via a suction pipe 28, into the pump 30. The suction pipe 28 has a branch connection 32 whereby a pool cleaning device may be connected to the suction pipe 28 of the pump 30. The suction pipe 28 has a change-over valve 44 so that inlet flow can take place via the inlet opening 18 and via the weir 22 or via the connection 32.

The pump 30 is driven by the motor 34, which is energized from a low voltage source preferably about 32 volts, and at the most 50 volts. The motor 34, may be supplied with power, from a step-down transformer 36, which is supplied from a domestic 15 Amp power source 37 (see FIG. 15).

The upper part 14 of the housing, has a top cover 38 which is removable, and which in use can provide a pool side table top. The top cover 38 has openings 39 for ventilation. In this regard it is to be appreciated that the cover can take any suitable form, hence, for example, it may be in the form of a diving board. Instead, the cover could be in the form of a slide.

The lower part 16 of the housing 12 is further provided with a lamp 40 which is itself energizable via leads 42, connected in parallel with the motor 34 to the step down transformer 36. The lower part 16 also has openings 17 to allow water to pass back into the pool. These openings 17 may be provided in the back wall 16.1 or the front wall 16.2 of the lower part 16.

Figure 13:
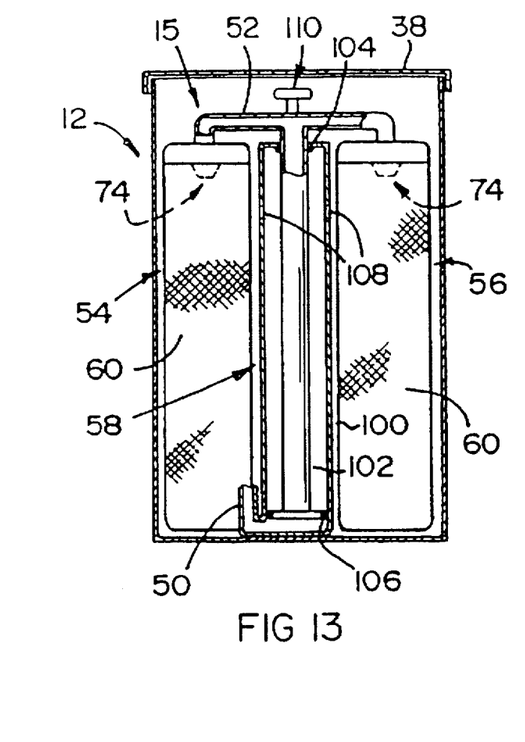
FIG. 13 shows a sectional elevation illustrating the filter unit in an operative condition.
Figure 14:
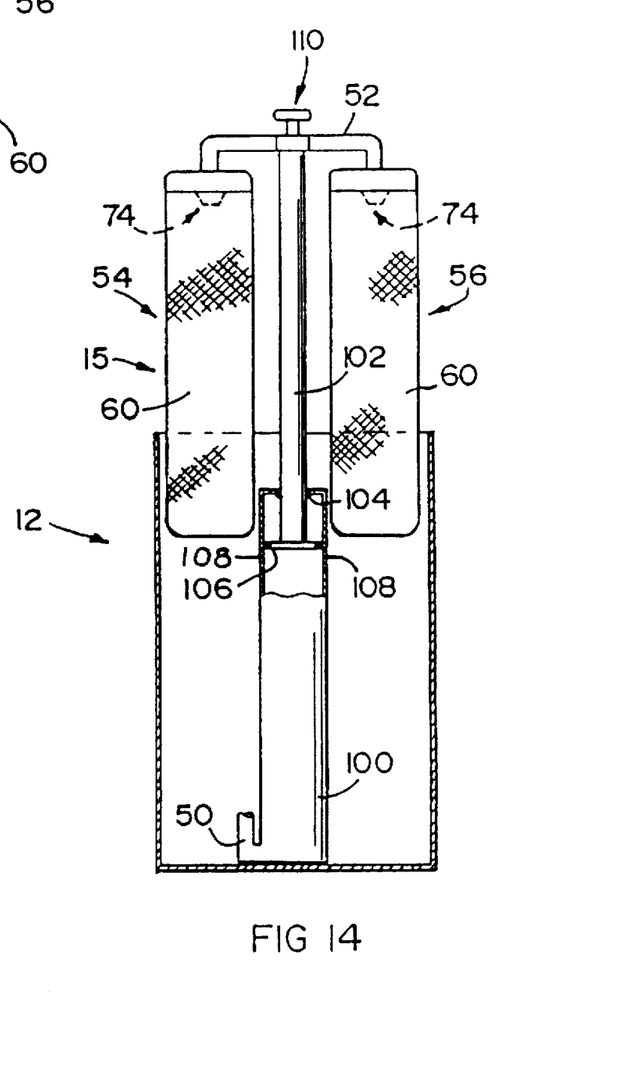
FIG. 14 shows a sectional elevation similar to FIG. 13 with the filter unit in an inoperative position.

Referring to FIGS. 13 and 14 the pump delivery 50 is connected to a manifold 52 which has a plurality of filter units 54, 56 connected in parallel thereto.

Figures 4, 5, 6, 7:
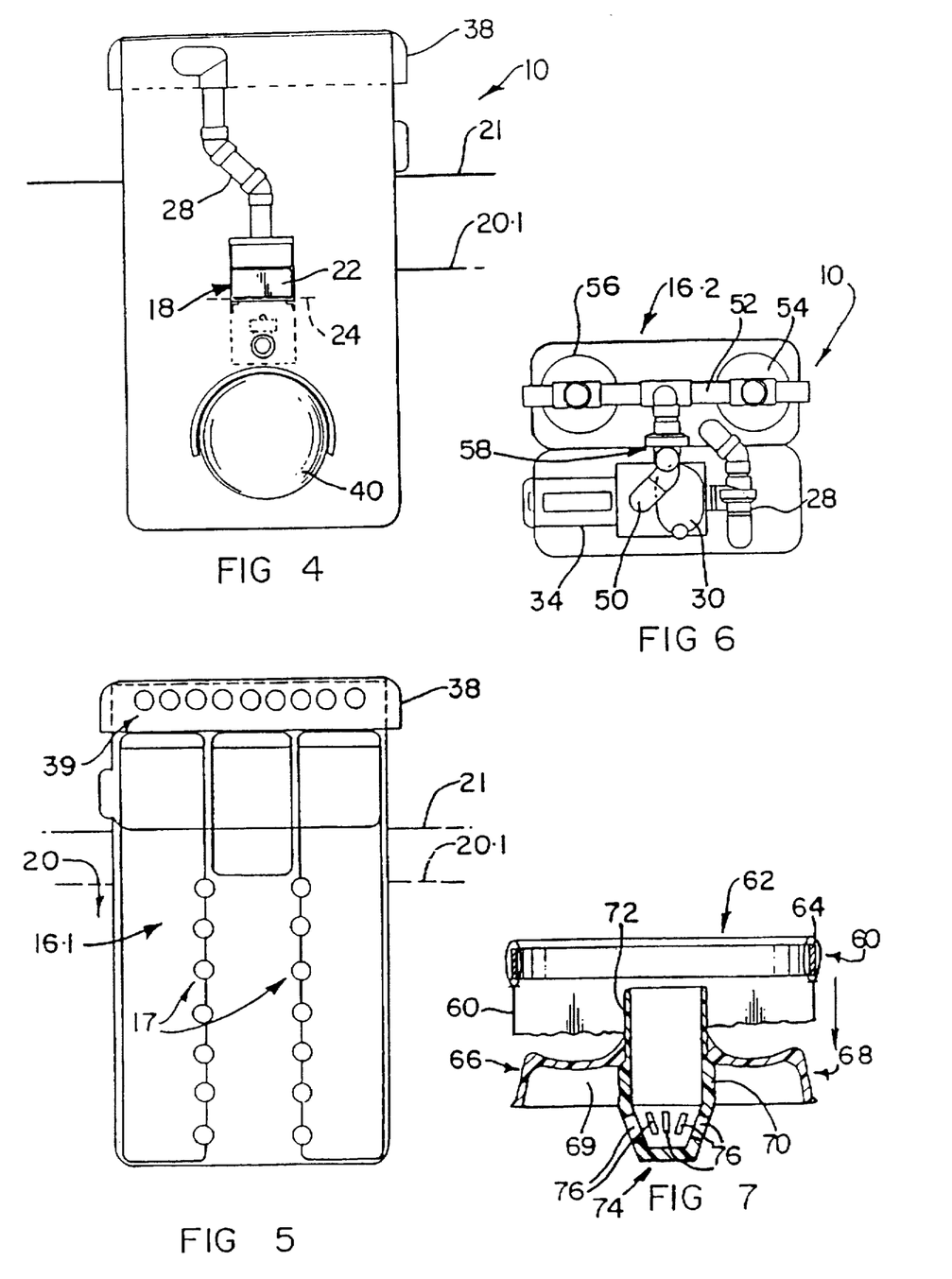
FIG. 4 shows a front elevation corresponding to FIG. 3.
FIG. 5 shows a back view corresponding to FIG. 4.
FIG. 6 shows a plan view corresponding to FIG. 5.
FIG. 7 shows a part sectional elevation of a filter bag cover member with filter bag.

Jacking means, generally indicated by reference numeral 58, is provided between the delivery 50 and the manifold 52 as is described in more detail below. If desired, further filter units (not shown) may be connected to the ends of the manifold 52. The filter units 54, 56 each comprises a filter bag 60 having a mouth opening 62, see FIG. 7, with a flexible resilient ring 64 around the mouth opening. The unit further comprises a filter bag cover member 66 which is of inverted dished formation defining a downwardly diverging filter bag seat 68 adapted in use to seat snugly within the mouth opening 62 of the filter bag 60. The filter bag cover member includes a top cover 69 and a flow conduit 70 with a connection 72 for connection to the manifold 52. A diffuser 74 is connected to the downstream end of the flow conduit 70. The diffuser 74 is generally frusto-conical in shape and includes a plurality of circumferentially spaced outwardly directed nozzles or openings 76 extending therethrough. Water flowing through the flow conduit 70 is thus directed outwardly by the nozzles 76 towards the sides of the filter bag 60 adjacent the mouth opening 62.

Figure 8:
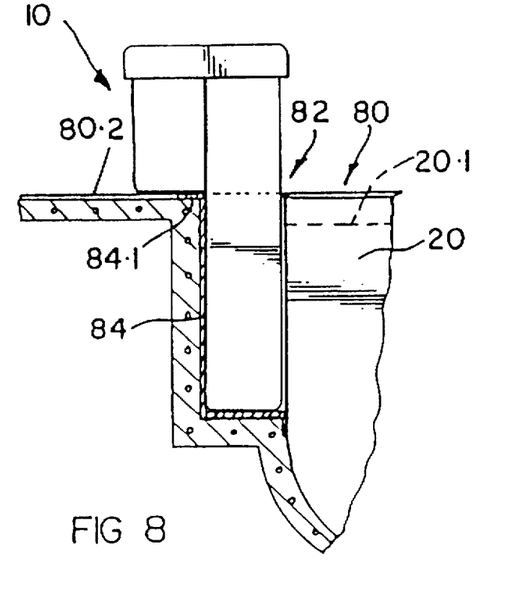
FIG. 8 shows a sectional side elevation of a pool having a recess to receive a filter in accordance with the invention.
Figure 9:
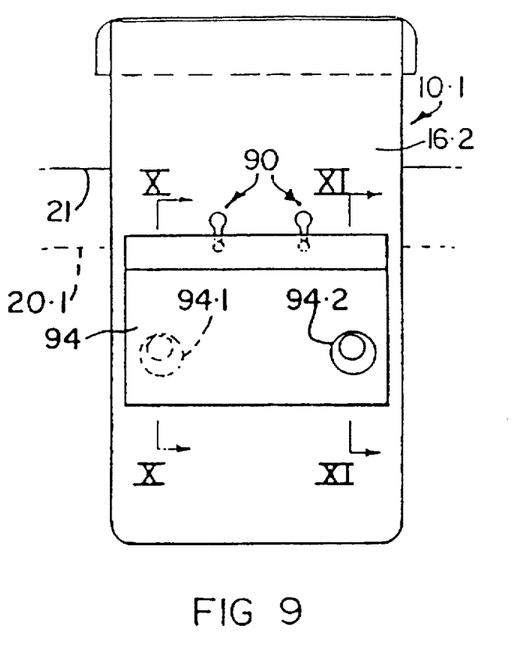
FIG. 9 shows a front elevation of an alternative embodiment of a filter in accordance with the invention, in combination with a detachable weir.
Figure 10:
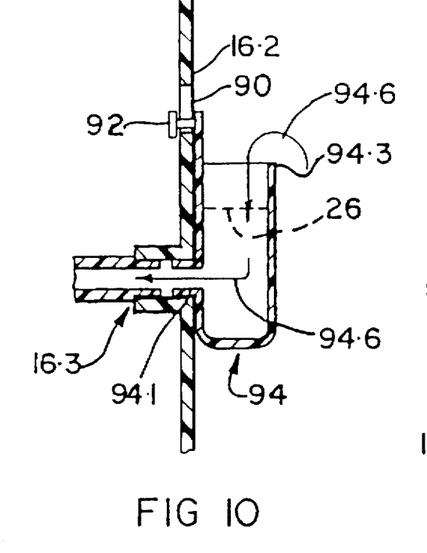
FIG. 10 shows a part-sectional elevation at X—X in FIG. 9.
Figure 11:
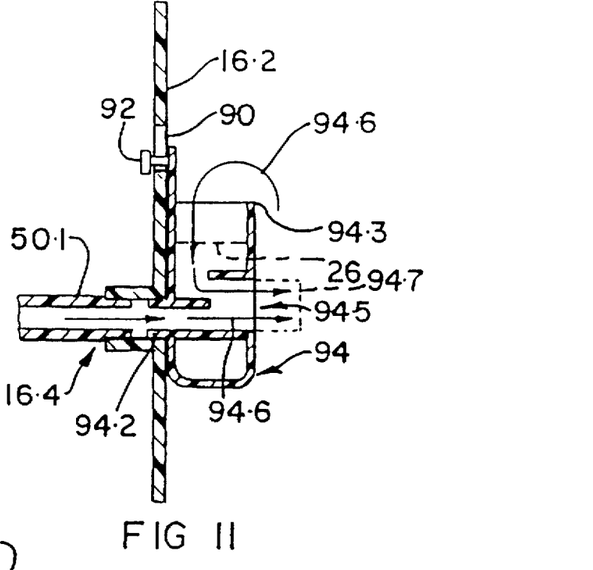
FIG. 11 shows a part-sectional elevation at XI—XI in FIG. 9.
Figure 12:
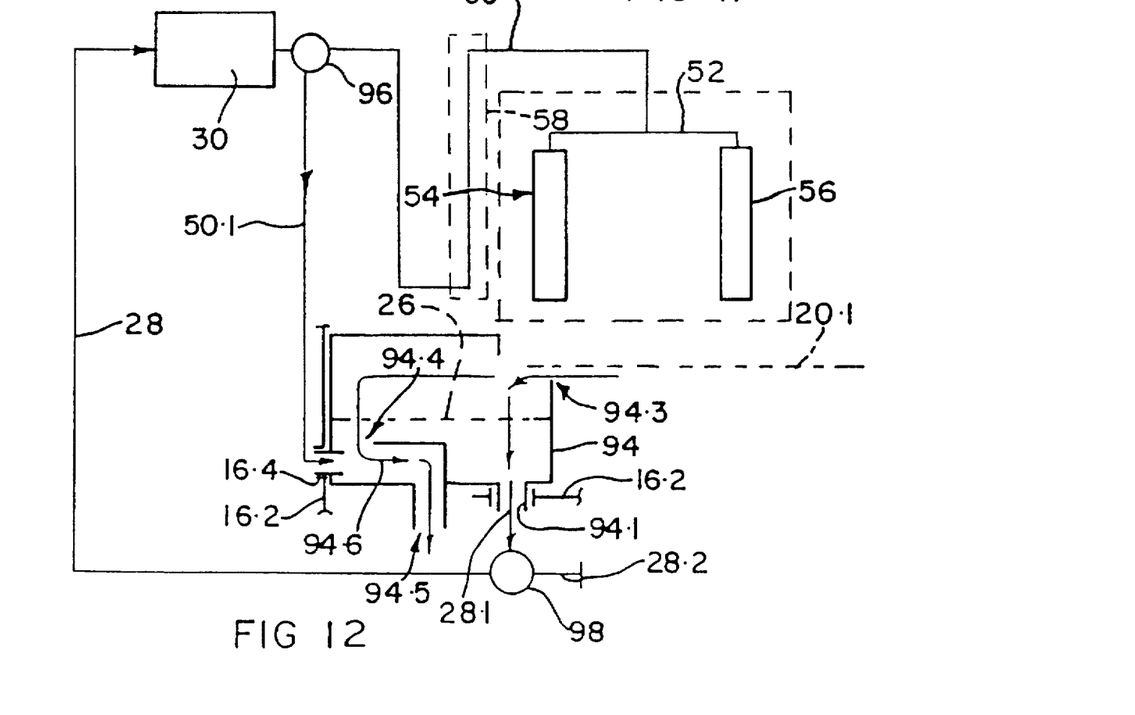
FIG. 12 shows a flow diagram of a filter installation incorporating a filter and weir in accordance with FIGS. 9 to 11 of the drawings.

Referring now to FIG. 8 of the drawings, there is shown a sectional side elevation of a swimming pool 80, built specifically to have a recess 82 to accommodate a filter 10 in accordance with the invention. The recess 82 has a lining 84 in the form of a synthetic plastic moulding. The plaster 80.2 is worked off level with the flanges 84.1 of the lining 84. If desired, inwardly projecting flanges (not shown) may be provided to retain a filter 10 in the recess 82 to prevent it from falling out of the recess 82.

Referring now to FIGS. 9 to 12 and 15, there is shown a filter 10.1 having a front wall 16.2 with openings 90 to be engaged by lugs 92 of a removable inlet chamber 94 having spigots 94.1 and 94.2 removably engageable with sockets 16.3 and 16.4, respectively, provided in the front wall 16.2. The socket 16.3 may also be engageable, for alternative use, by the suction hose of a pool-cleaning device (not shown) if a separate connection is not provided. The socket 16.4 provides an alternative or bypass outlet 50.1 for the pump 30. By using such a bypass 50.1, increase flow of water over the weir edge 94.3 is obtainable by water being drawn in the manner of an ejector out of the inlet chamber 94, through opening 94.4 and out of the outlet 94.5. The direction of flow of water through the weir 94 is indicated by arrows 94.6. By providing a deflecting wall 94.7, it is possible to have flow of water out of outlet 94.5 in a direction parallel to the front wall 16.2. This will result in flow out of the filter taking place parallel to the pool wall, and will aid in the circulation of water in the pool.

The control of delivery flow from the pump 30 along delivery line 50 or along alternative delivery line 50.1, or the apportionment of flow along these lines, takes place by operation of valve 96. The control of flow along such a line 28 in direction 28.1 or 28.2 (from a pool cleaning device not shown) or apportionment of flow takes place via a valve 98. If desired a water feature such as a fountain (not shown) may be provided with water being supplied to the water fountain along line 50.2 which leads from line 50.1. The control of flow along the lines 50.1, 50.2 is regulated by the valve 98.

If desired, an inlet chamber, such as a chamber 94, may be formed integrally with or built into the lower part 16, instead of being removably attachable to part 16.

As can best be seen in FIGS. 13 and 14 of the drawings, the jacking means 58 comprises a vertical tubular outer member 100 and a tubular inner member 102 which is mounted to slide within the outer member 100 and has an upper portion which protrudes upwardly from the outer member 100. The lower end of the outer member 100 is connected to the delivery 50 from the pump and the upper or protruding end of the inner member 102 is connected to the manifold 52. A seal 104 is mounted in the outer member 100 and sealingly engages the outer surface of the inner member 102. Further, a seal 106 is mounted on the inner member 102 and seals against the inner surface of the outer member 100. Bleed openings or ports 108 lead from the outer member 100 adjacent its operatively upper end. A valve 110 is positioned to regulate the flow of water through the inner member 102 as described in more detail herebelow.

In use, the valve 110 is normally fully open and water flows from the delivery 50 into the lower end of the outer member 100 where it passes through the inner member 102 into the manifold 52 and the openings 76 in the diffusers 74 into the filter bags 60 from where it is returned to the swimming pool in the manner described above.

When the filter bags 60 become dirty and require cleaning or replacement, the cover 38 is removed and the valve 110 is closed so as to restrict flow of water through the inner member 102. As a result, pressure builds up with in the outer member 100 below the seal 109 and in inner member 102. This increase in pressure displaces the inner member 102 and the manifold 52 and filter bags 60 upwardly relative to the outer member 100. This upward displacement of the inner member 102 continues until the seal 106 passes the ports 108 thereby permitting water to flow from the outer member 100 and return to the pool. In this fully extended or raised position the filter bags 60 are readily accessible permitting their removal for cleaning and/or replacement. This is done by disconnecting each filter bag 60 from its associated cover member 66 and cleaning the bag in a conventional fashion. Once cleaned, the bag can again be mounted on its own filter bag cover member 66. Once the filter bags 60 have all been cleaned and/or replaced, the valve 110 is opened and/or operation of the pump is interrupted. This allows the inner member 102 to retract under the influence of gravity thereby returning the manifold 52 and the filter bags 60 to their operative condition. Normal operation of the filter can then be resumed.

It will be appreciated by persons skilled in the art that the flow through the jack can be arranged to pass through the outer member connected to the manifold and with the inner member held stationary.

Figure 1:
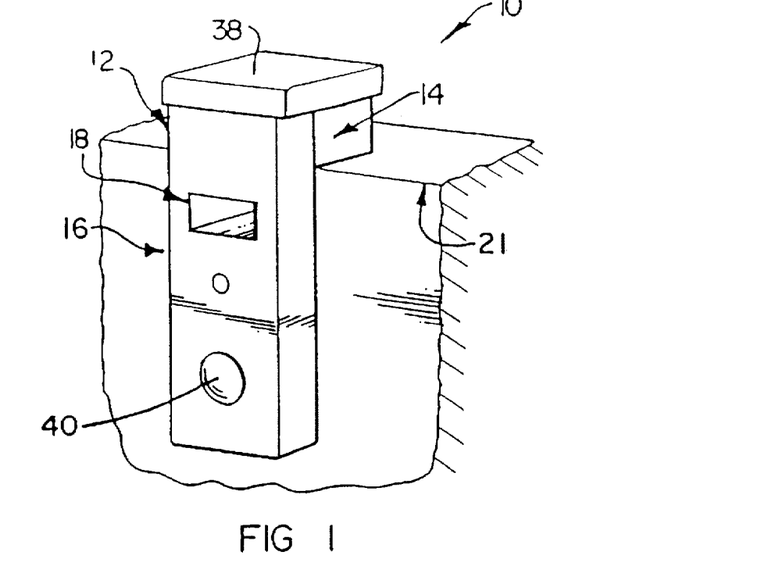
FIG. 1 shows a three-dimensional view of a filter in accordance with the invention as mounted on the edge of a swimming pool.
Figure 2:
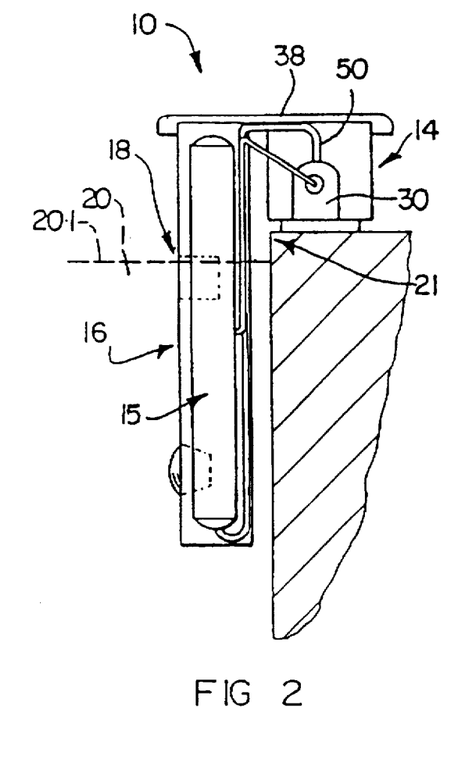
FIG. 2 shows a sectional side elevation corresponding to FIG. 1.
Figure 3:
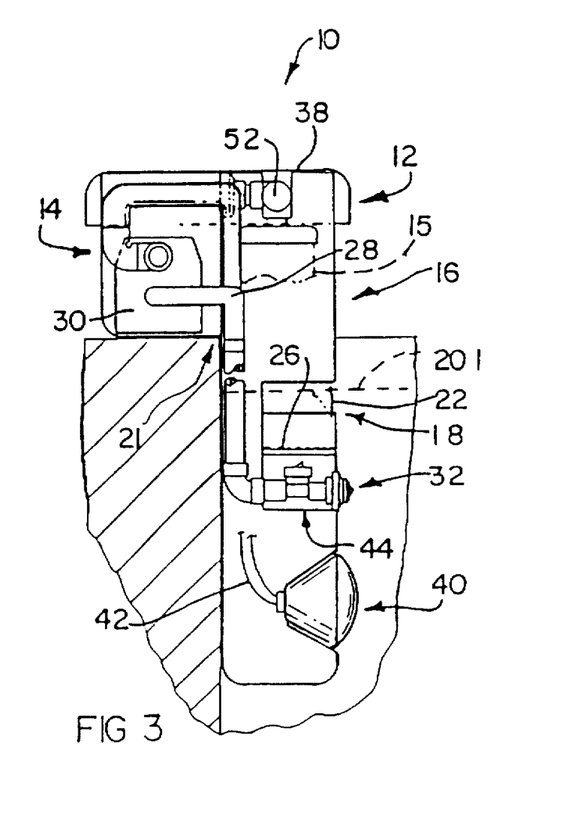
FIG. 3 shows a sectional side elevation of another embodiment, in more detail.

As mentioned above, the arrangement of the nozzles 76 is such that water flowing through the diffuser 74 is directed towards the sides of the filter bag 60 adjacent its mouth opening 62. This serves to dislodge filtered matter from the wall of the bag and thereby prolong the interval between cleaning and/or replacement of the bags. As can best be seen in FIG. 3 of the drawings, the mouth opening 62 of the filter bag 60 is positioned well above the surface 20.1 of water 20. Hence, when operation of the pump is interrupted, the level of water within the filter bags 60 falls to the level of the surface 20.1. When operation of the pump is recommended, the water flowing into the filter bag through nozzles 76 is directed onto the sides of the bag further enhancing the cleaning of the bags. This results in an accumulation of filtered matter is at the bottom of each filter bag but however ensures efficient operation of the filter unit.

If desired, a coupling 112 may be provided between the manifold 52 and the upper end of the inner member 102 to permit disconnection of the manifold 52 from the jacking means 58.

Figure 15:
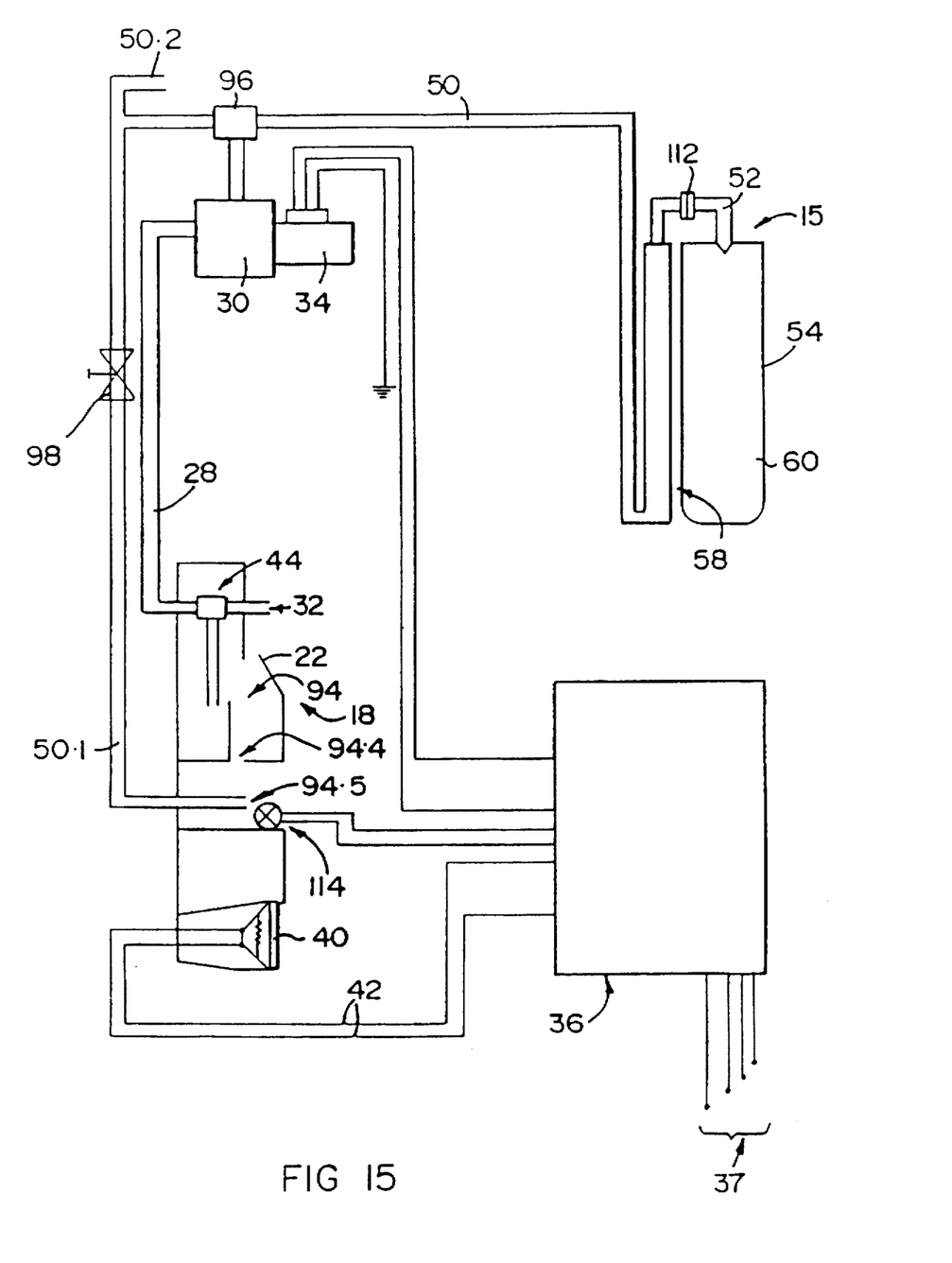
FIG. 15 shows a schematic drawing of the filter in accordance with the invention.

Further, as can best be seen in FIG. 15 of the drawings, the filter includes an automatic chlorinator, generally indicated by reference numeral 114. The chlorinator 114 is positioned such that water re-entering the swimming pool through the jet 94.5 is chlorinated. Further where the chlorinator 114 is a salt chlorinator it will be connected so that it is energised simultaneously with the electric motor thereby ensuring that water is chlorinated only while the pump is operating.

A filter in accordance with the invention has the advantage that if anything should go wrong with it, then it can be removed bodily for repair, and a replacement unit can be put in its place while the filter is being repaired. Such a unit can also serve as a temporary filter unit to keep the filtration of water in a pool under control if a permanent filter installation is out of action for some time for repair.

It is a further advantage of this invention that the filter can be placed at any one of a number of positions around the upper edge of a pool thereby making it possible for a pool-cleaning device (not shown) to be connected to the connection 32, to operate over the whole pool area adequately, without having an excessively long suction pipe between the filter 10 and the pool cleaning device. In addition, the provision of the nozzles 76 ensures that the filter bags 60 operate efficiently for a long period. In addition, the provision of the jacking means 58 facilitates cleaning and/or replacement of the filter bags when necessary. A further advantage is the provision of the automatic chlorinator 114 which further serves to reduce the effort and maintenance required by a pool owner.

What I claim as new and desire to secure by Letters Patent is:

1. A water filter having a housing with a flow passage therethrough with an inlet and out outlet and which includes between the inlet and the outlet a filter unit comprising at least one filter bag and a hydraulic jack located said flow passage between said inlet and said filter bag, said jack being constructed and arranged to displace said filter bag between an operative position in which water to be filtered can pass therethrough, and a displaced position in which said filter bag is readily accessible for cleaning or replacement.

2. A water filter as claimed in claim 1 in which the filter unit includes a plurality of filter bags connected in parallel to a manifold having an inlet connectable to the delivery of a water pump.

3. A water filter as claimed in claim 2 in which said jack is connected between said manifold and said flow passage inlet.

4. A water filter as claimed in claim 3 in which the jack includes a pair of telescopic tubular relatively vertically extensible inner and outer members having a flow passage through one of the members connectable to pump delivery and valve means to control the flow passage through one of the members connectable to pump delivery and valve means to control the flow through the passage to allow the tubular members to remain contracted or to be relatively extended.

5. A water filter as claimed in claim 4 in which the member not connectable to the pump delivery has a bleed passage in communication with the outlet from the filter.

6. A water filter as claimed in claim 5 in which the flow passage is through the inner telescopic member.

7. A water filter as claimed in claim 1 which includes inlet means for directing liquid to be filtered into the filter bag, the means being being constructed and arranged that at least a portion of the liquid fed into the filter bag is directed in the form of a jet towards the side of the filter bag to dislodge filtered matter therefrom.

8. A water filter as claimed in claim 7 in which the filter bag inlet means includes a plurality of circumferentially spaced outwardly directed nozzles configured to direct water flowing therethrough towards the sides of the filter bag.

9. A water filter as claimed in claim 1 in which an automatic water chlorinator is included.

10. A water filter as claimed in claim 9 in which the chlorinator is a salt chlorinator with means for energisation operable only with operation of a pump connected to the filter.

* * * * *

UNITED STATES PATENT AND TRADEMARK OFFICE
CERTIFICATE OF CORRECTION

PATENT NO. : 5,800,703
DATED : September 1, 1998
INVENTOR(S) : Duncan C. McGregor It is certified that error appears in the above-identified patent and that said Letters Patent is hereby corrected as shown below:

On the title page, item: "[73] Assignee:" delete "Katah Holding AB" and substitute therefor -- Katan Holding AG --

Column 4, line 58, delete "109" and substitute therefor -- 106 --

Column 6, claim 1, line 11, delete "out"

Column 6, claim 1, line 13, after "located" insert -- in --

Column 6, claim 7, line 41, delete "being"

Signed and Sealed this

Twenty-third Day of February, 1999

Attest:

Attesting Officer

Q. TODD DICKINSON

Acting Commissioner of Patents and Trademarks